(12) United States Patent
Bérard et al.

(10) Patent No.: US 12,586,279 B2
(45) Date of Patent: Mar. 24, 2026

(54) ANIMATION COMPOSITOR FOR DIGITAL AVATARS

(71) Applicant: NVIDIA Corporation, Santa Clara, CA (US)

(72) Inventors: Pascal Joël Bérard, Zürich (CH); Christian Eduard Schüller, Frauenfeld (CH); Riccardo Roveri, Zug (CH)

(73) Assignee: NVIDIA Corporation, Santa Clara, CA (US)

( * ) Notice: Subject to any disclaimer, the term of this patent is extended or adjusted under 35 U.S.C. 154(b) by 119 days.

(21) Appl. No.: 18/317,156

(22) Filed: May 15, 2023

(65) Prior Publication Data

US 2024/0386644 A1     Nov. 21, 2024

(51) Int. Cl.
*G06T 13/00* (2011.01)

(52) U.S. Cl.
CPC .......... *G06T 13/00* (2013.01); *G06T 2200/24* (2013.01)

(58) Field of Classification Search
CPC ..... G06T 13/00; G06T 2200/24; G06T 13/40; G06T 13/80; G11B 27/031; G11B 27/34; G06F 3/048
See application file for complete search history.

(56) References Cited

U.S. PATENT DOCUMENTS

| | | | | |
|---|---|---|---|---|
| 2010/0168874 A1* | 7/2010 | Lucas | ..................... | H04L 67/56 |
| | | | | 700/17 |
| 2013/0038601 A1* | 2/2013 | Han | ......................... | G06F 3/011 |
| | | | | 345/473 |
| 2019/0347842 A1* | 11/2019 | Henry | ................. | G06F 3/04817 |
| 2022/0383575 A1* | 12/2022 | Ozawa | ..................... | G06T 13/40 |
| 2024/0193837 A1* | 6/2024 | Stemple | .................. | G06F 3/011 |

* cited by examiner

*Primary Examiner* — Xiao M Wu
*Assistant Examiner* — Latrell Anthony Creary
(74) *Attorney, Agent, or Firm* — Lowenstein Sandler LLP

(57) ABSTRACT

Disclosed are systems and techniques for rendering digital avatar animations. The techniques include receiving a user input associated with an interaction of a user with a digital avatar, identifying, based at least on the user input, a state of the interaction, and obtaining, based at least on the state, one or more animations and one or more configuration settings corresponding to the one or more animations. The techniques further include generating a blended animation based at least on the one or more animations and the one or more configuration settings for the one or more animations, rendering a temporal sequence of frames based at least on the blended animation, and causing a presentation of the temporal sequence of frames.

20 Claims, 6 Drawing Sheets

300

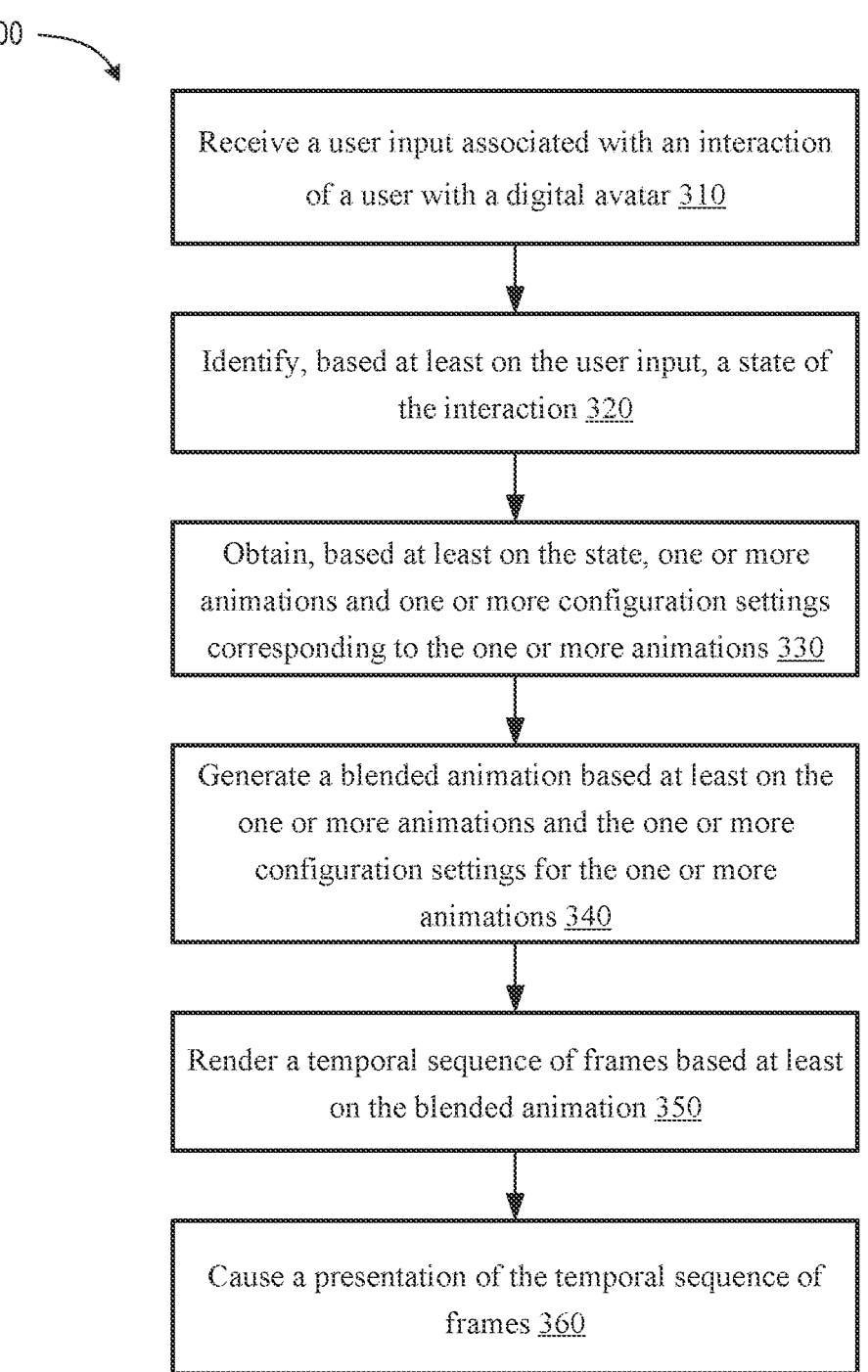

Receive a user input associated with an interaction of a user with a digital avatar 310

Identify, based at least on the user input, a state of the interaction 320

Obtain, based at least on the state, one or more animations and one or more configuration settings corresponding to the one or more animations 330

Generate a blended animation based at least on the one or more animations and the one or more configuration settings for the one or more animations 340

Render a temporal sequence of frames based at least on the blended animation 350

Cause a presentation of the temporal sequence of frames 360

FIG. 3

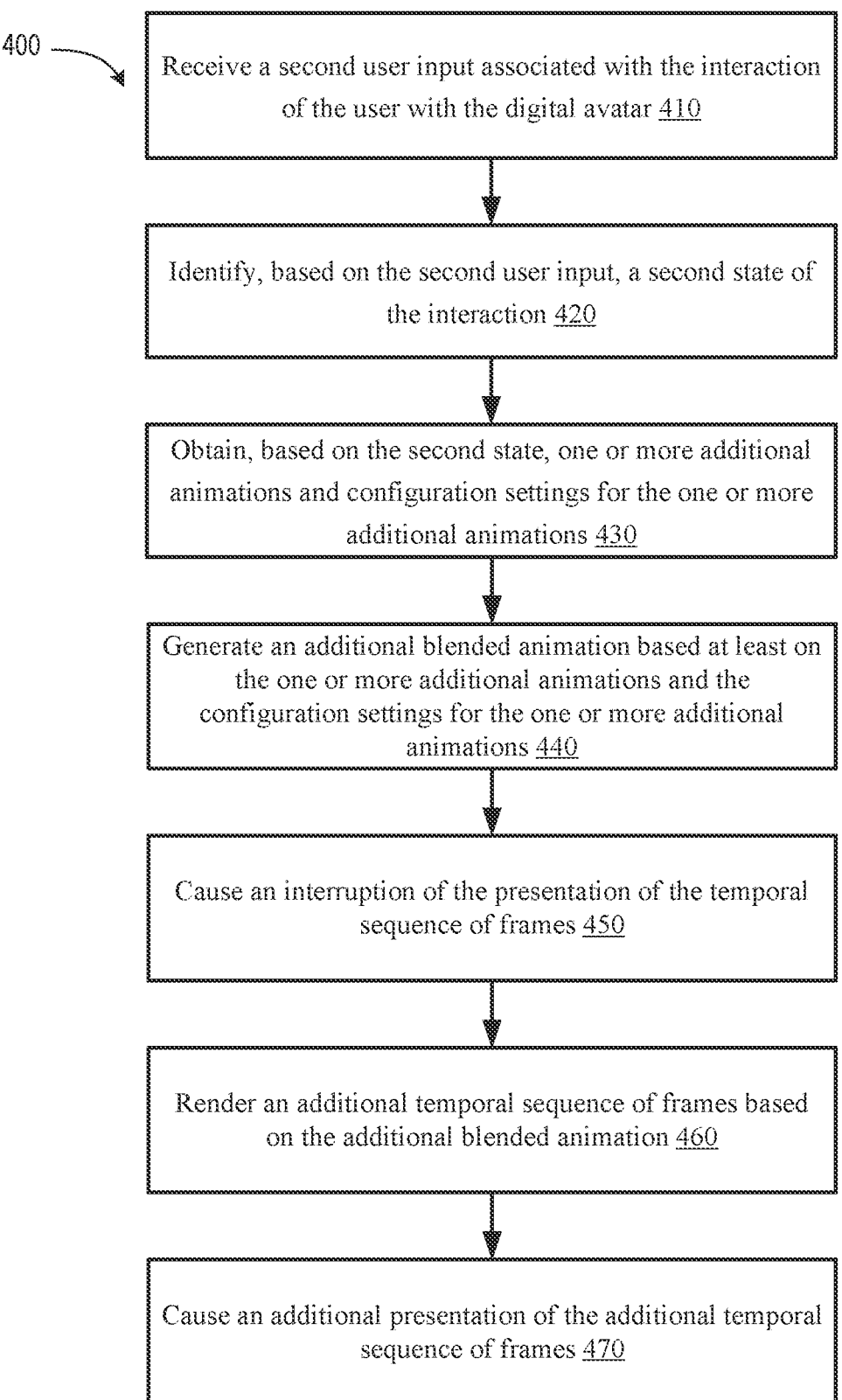

400 —

Receive a second user input associated with the interaction of the user with the digital avatar 410

Identify, based on the second user input, a second state of the interaction 420

Obtain, based on the second state, one or more additional animations and configuration settings for the one or more additional animations 430

Generate an additional blended animation based at least on the one or more additional animations and the configuration settings for the one or more additional animations 440

Cause an interruption of the presentation of the temporal sequence of frames 450

Render an additional temporal sequence of frames based on the additional blended animation 460

Cause an additional presentation of the additional temporal sequence of frames 470

APPLICATION SERVER(S) 602

RENDERING COMPONENT 612

GPU(S) 610

RENDER CAPTURE COMPONENT 614

CPU(S) 608

ENCODER 616

COMM. INTERFACE 618

NETWORK(S) 606

COMM. INTERFACE 620

INPUT DEVICE(S) 626

DECODER 622

DISPLAY 624

CLIENT DEVICE(S) 604

ANIMATION COMPOSITOR FOR DIGITAL AVATARS

TECHNICAL FIELD

At least one embodiment pertains to a system used to animate a digital avatar in real-time or near real-time during interactions with users.

BACKGROUND

Digital avatars are computer systems configured to interact with human users. A digital avatar can be represented using animated graphics on a digital screen or other display modality and can communicate to human users using sounds and information displayed on the screen. A human user may be able to interact with the digital avatar using voice commands, gestures, touchscreen interfaces, and/or using other I/O device types. Digital avatars may be used to assist users in completing electronic tasks, such as finding answers to frequently asked questions (FAQs), ordering products from an online store, making a reservation at a restaurant or hotel, and so on.

BRIEF DESCRIPTION OF DRAWINGS

FIG. 3 is a flow diagram of an example method of controlling animations of a digital avatar in real-time or near real-time, according to at least one embodiment;

FIG. 4 is a flow diagram of an example method of controlling animations of a digital avatar in real-time or near real-time, according to at least one embodiment;

DETAILED DESCRIPTION

Figure 1:
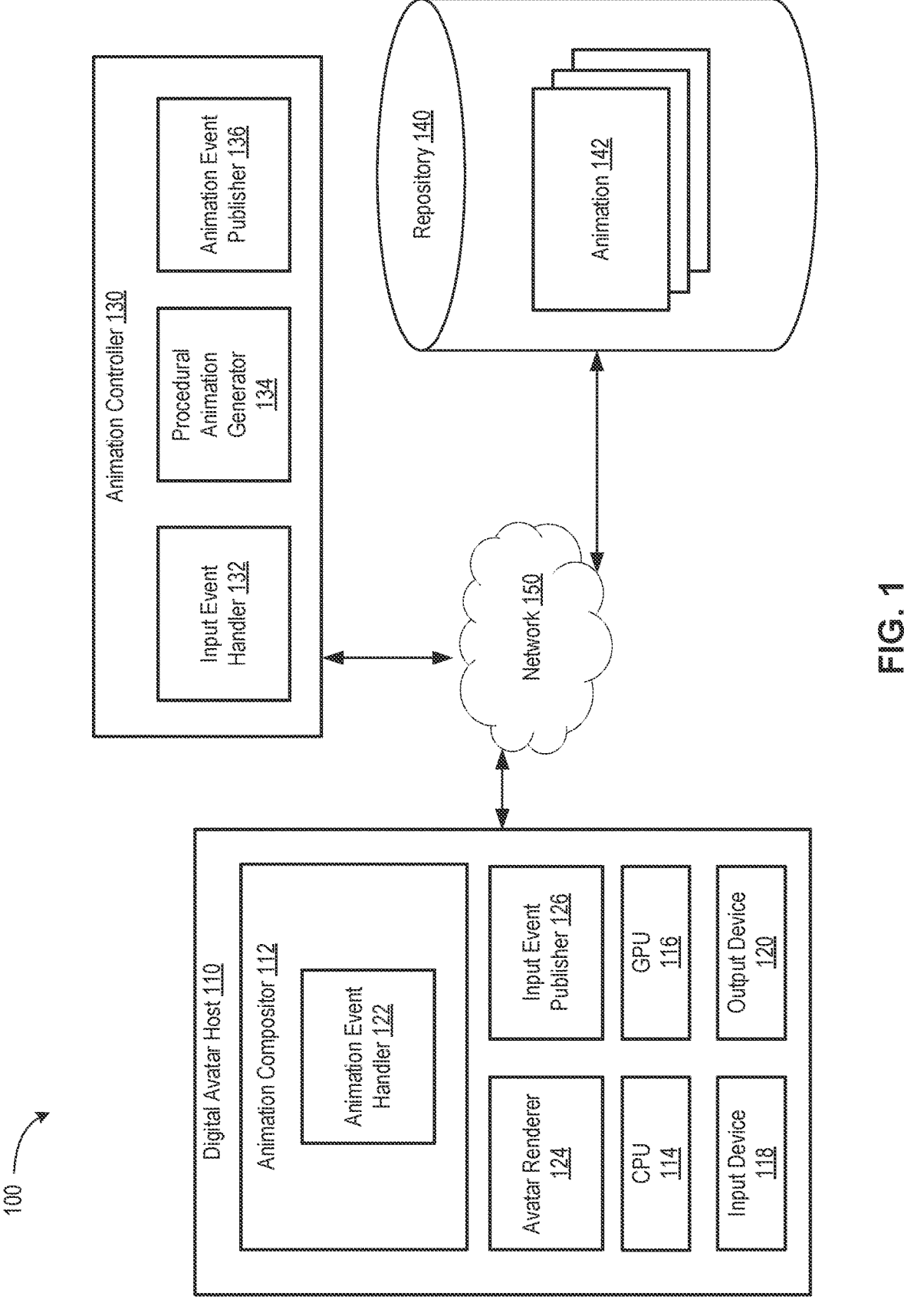
FIG. 1 illustrates an example digital avatar system for controlling animations of a digital avatar in real-time or near real-time, according to at least one embodiment.

A digital avatar system may be configured to display, on a user interface, various animations during an avatar-user interaction (e.g., waving a hand, pointing at an object, moving lips while speaking, and the like). Designing and configuring these animations is presently a complex task. Each animation may be composed of various skeleton transformations, blendshapes, and/or other animation techniques. One or more animations can be combined in a blend tree. Each blend tree may be created and configured before the digital avatar is deployed, such that the animations of the digital avatar cannot be modified after deployment. Each animation of the digital avatar may also have corresponding audio and/or graphical elements that should accompany the animation. All of the various components (e.g., animations, audio, graphical elements, and the like) of the digital avatar need to be synchronized and coordinated to provide an effective avatar-user interaction. Difficulties related to configuring animation blend trees and synchronizing the various components of a digital avatar can make deploying digital avatars infeasible for small development teams.

Aspects and embodiments of the present disclosure address these and other technological challenges by providing systems and techniques that use real-time events to generate blend logic that apply animations to digital avatars at runtime. By applying animations to digital avatars at runtime instead of at time of deployment, the work required to deploy a digital avatar may be reduced substantially, and the ability of the system to react dynamically to user events and generate corresponding animations on-the-fly is improved. A system based on the present disclosure may include an animation compositor that may be able to combine one or more animations (e.g., from an animation repository, procedurally generated animations, animations generated using artificial intelligence (AI) and/or machine learning, animations generated frame-by-frame in real-time, etc.) in response to receiving events from an animation controller (e.g., a dialog manager, a large language model, etc.). Each event sent to the animation compositor may include one or more animations, each with one or more properties (e.g., start delay, duration, blend-in duration, blend-out duration, opacity, etc.). Each animation may include facial animations, body animations, camera animations, light animations, user interface animations, and/or the like.

In some embodiments, an animation may include a corresponding audio to be played while the animation is shown. The corresponding audio may include one or more associated properties (e.g., volume, start delay, sound channel, etc.). The animation compositor may add the animation(s) from the event to a timeline based on the properties of the animation. For example, if the animation has a start delay, the animation may be added to the timeline at a point in the future. Multiple animations may be included on the timeline at the same moment such that all or part of a first animation may overlap all or part of a second animation. Individual animations may have a corresponding blending weight (e.g., opacity, priority). The animation compositor may blend the animations using the blending weight of each animation that overlaps at a given point in time on the timeline. The blending weights may be based on a priority property of respective animations. For example, animations with a higher priority may have a higher weight and may be more prominent in the resulting animation. The animation compositor may, for each frame of the timeline (e.g., 60 frames per second), generate rendering data containing skeleton transformations and/or blendshapes based on the animations contained at that point of the timeline. The rendering data may be provided to a renderer that applies the skeleton transformations and/or blendshapes to a rendered digital avatar.

In some embodiments, the animation controller may store data related to the state of the animation compositor. For example, the animation controller may store a list of identifiers associated with animations that have been added to the timeline of the animation compositor. Based on a user interaction, the animation controller may send an event to the animation compositor that stops or modifies one of the animations in the timeline in real-time or near real-time. Based on another user interaction, the animation controller may send an event to the animation compositor that schedules a new animation. The event may contain an animation based on a speech the digital avatar is to vocalize. For example, the event may contain an audio file generated by a text-to-speech engine and may include an animation that moves the mouth of the digital avatar in sync with the speech audio.

In some embodiments, the animation compositor may blend graphical elements instead of (or in addition to) skeleton transformations and/or blendshapes. For example, a graphical user interface (GUI) may include multiple layers of elements. Some layers may only appear for a few frames, while others are present for many frames. Graphical elements of a higher layer may cover graphical elements contained within a lower layer. Each layer of the GUI may correspond to an animation priority. The animation controller may send an event to the animation compositor that contains a graphical element to display (e.g., a text, an image, one or more shapes, and the like) and one or more properties (e.g., a duration, an opacity, a priority/layer, and the like).

The advantages of the disclosed techniques include but are not limited to systems and methods that allow a user to apply animations to a digital avatar at runtime, based on real-time or near real-time events, instead of at time of development. The animation controller may be able to control all aspects of the digital avatar (e.g., audio, animations, graphical elements, and/or the like), resulting in easier deployment of a digital avatar. Because the animations and the corresponding properties can be modified in real-time or near real-time and are not predefined at time of deployment (e.g. in a rigid blend tree), the digital avatar system can dynamically react to input events and dynamically update which animations are blended and how they are blended (e.g. based on the weight, based on the priority, etc.). As such, computing resources of the digital avatar system can be used more effectively and can be allocated based on real-time needs of the system.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as large language models (LLMs), systems for performing light transport simulation, systems for performing collaborative content creation for 3D assets, systems implemented at least partially using cloud computing resources, and/or other types of systems.

System Architecture

FIG. 1 illustrates an example digital avatar system 100 for controlling animations of a digital avatar in real-time or near real-time, according to at least one embodiment. In some embodiments, digital avatar system 100 may include digital avatar host 110, animation controller 130, and repository 140 connected to a network 150. Network 150 may be a public network (e.g., the Internet), a private network (e.g., a local area network (LAN), or a wide area network (WAN)), a wireless network, a personal area network (PAN), a combination thereof, and/or another network type.

Digital avatar host 110 may be a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, an in-vehicle infotainment computing device, and/or any suitable computing device capable of performing the techniques described herein. Digital avatar host 110 may include animation compositor 112 for blending animations in real-time or near real-time. In some embodiments, animation compositor 112 includes animation event handler 122 that receives events from animation controller 130. Individual events may include one or more animations, with each animation having one or more properties (e.g., start delay, duration, blend-in duration, blend-out duration, opacity, etc.) Animations may also include facial animations, body animations, skeletal animations, camera animations, light animations, user interface animations, and/or the like. In some embodiments, an animation may include an accompanying audio to be played while the animation is shown. The corresponding audio may include one or more associated properties (e.g., volume, start delay, sound channel, etc.). Animation event handler 122 may add the animation(s) from each event to a timeline of animation compositor 112 based on the properties of the animation, as further described in relation to FIG. 2 below.

In some embodiments, digital avatar host 110 may include avatar renderer 124 and one or more processing devices, such as central processing unit (CPU) 114 and/or graphical processing unit (GPU) 116. Avatar renderer 124 may perform operations (e.g., via CPU 114 and/or GPU 116) including rendering the animations received by animation compositor 112. Digital avatar host 110 may include one or more output device(s) 120 for reproducing a digital avatar and the animations from animation compositor 112. Output device(s) 120 may include an audio output device (e.g., a speaker), a visual display output device (e.g., a monitor or digital display), and/or a combination thereof. In some embodiments, digital avatar host 110 may include one or more input device(s) 118 to receive a real-time or near real-time interaction from a user interacting with the digital avatar presented by digital avatar host 110. Input device(s) 118 may include an audio input device (e.g., a microphone), a visual input device (e.g., a camera, a radar, a motion sensor, etc.), a physical input device (e.g., a button, a touchscreen interface, a switch, etc.), another type of input device, and/or any combination thereof. In some embodiments, digital avatar host 110 includes input event publisher 126 that sends input events based on interactions from a user to animation controller 130.

In some embodiments, animation controller 130 may include input event handler 132, procedural animation generator 134, and animation event publisher 136. In some embodiments, animation controller 130 is part of a computing device separate from digital avatar host 110. In some embodiments, animation controller 130 is contained within and/or is part of digital avatar host 110. In some embodiments, animation controller 130 may include a dialog manager, a large language model, and/or the like. Responsive to input event handler 132 receiving indication of a user interaction (e.g., from input event publisher 126 of digital avatar host 110), animation controller 130 may send an event to animation compositor 112 (e.g., via animation event publisher 136). The event may instruct animation compositor 112 to schedule an animation to be displayed immediately (or in the future, e.g., at a specified time, after a specified amount of time has passed, or responsive to a triggering event/condition), to modify one or more properties of an animation that is being displayed (or is to be displayed in the future), to stop playback of an animation, to prevent an animation from being displayed in the future, or the like. For example, based on a first user interaction, input event handler 132 may cause animation event publisher 136 to send an event to animation compositor 112 that modifies, in real-time or near real-time, one or more properties of an animation being displayed by digital avatar host 110. Based on a second user interaction, input event handler 132 may cause animation event publisher 136 to send an event to animation compositor 112 that schedules a new animation to be displayed. Animation controller 130 may store data related to the state of animation compositor 112. For example, animation controller 130 may store a list of identifiers associated with animations that have been added to the timeline of animation compositor 112. In some embodiments, in order to stop or update an animation, animation controller 130 may include an identifier of the animation to be stopped or updated in the event sent to animation compositor 112.

In some embodiments, procedural animation generator 134 is used to generate an animation based on a formula, function, or an algorithm. In some embodiments, procedural animation generator 134 includes one or more machine learning models (e.g., deep neural networks (DNNs)) for generating an animation. For example, procedural animation generator 134 may include a machine learning model that can synchronize the lips of a digital avatar to a segment of audio (e.g., Wav2Lip, Audio2Face, Audio2Emotion, etc.). For example, an event sent to animation compositor 112 may contain an audio file generated by a text-to-speech engine and may include an animation generated by procedural animation generator 134 that moves the mouth of the digital avatar in sync with the audio file. As another example, procedural animation generator 134 may generate an animation (e.g., based on input signals from digital avatar host 110) that causes the eyes of a digital avatar to maintain eye contact with a user interacting with the digital avatar.

In some embodiments, an event may include a predefined animation. The predefined animation (e.g., animation 142) may be retrieved from repository 140. In some embodiments, animation event publisher 136 retrieves animation 142 from repository 140 (e.g., via network 150) and includes the animation within the event that is transmitted to animation compositor 112. In some embodiments, an identifier of animation 142 is included in the event. Animation compositor 112 may then retrieve animation 142 from repository 140 (e.g., via network 150) based on the identifier included in the event.

Repository 140 may include a persistent storage capable of storing one or more animations 142 and/or properties corresponding to the animations. Repository 140 may also store one or more audios and/or audio properties corresponding to the animations. Repository 140 may be hosted by one or more storage devices, such as main memory, magnetic or optical storage disks, tapes, or hard drives, network-attached storage (NAS), storage area network (SAN), and so forth.

Although depicted as separate from digital avatar host 110, in at least some embodiments, repository 140 may be part of digital avatar host 110. In some embodiments, repository 140 may be part of animation controller 130 (or stored on a server/machine that hosts animation controller 130). In at least some embodiments, repository 140 may be a network-attached file server, while in other embodiments, repository 140 may be some other type of persistent storage, such as an object-oriented database, a relational database, and so forth. In some embodiments, repository 140 may be hosted on or may be a component of one or more of digital avatar host 110 and animation controller 130. Repository 140 may store animations that may be rendered by digital avatar host 110. In some embodiments, repository 140 may store an animation generated by procedural animation generator 134 after it has been generated, to avoid the need to re-generate the same animation in the future.

Figure 2:
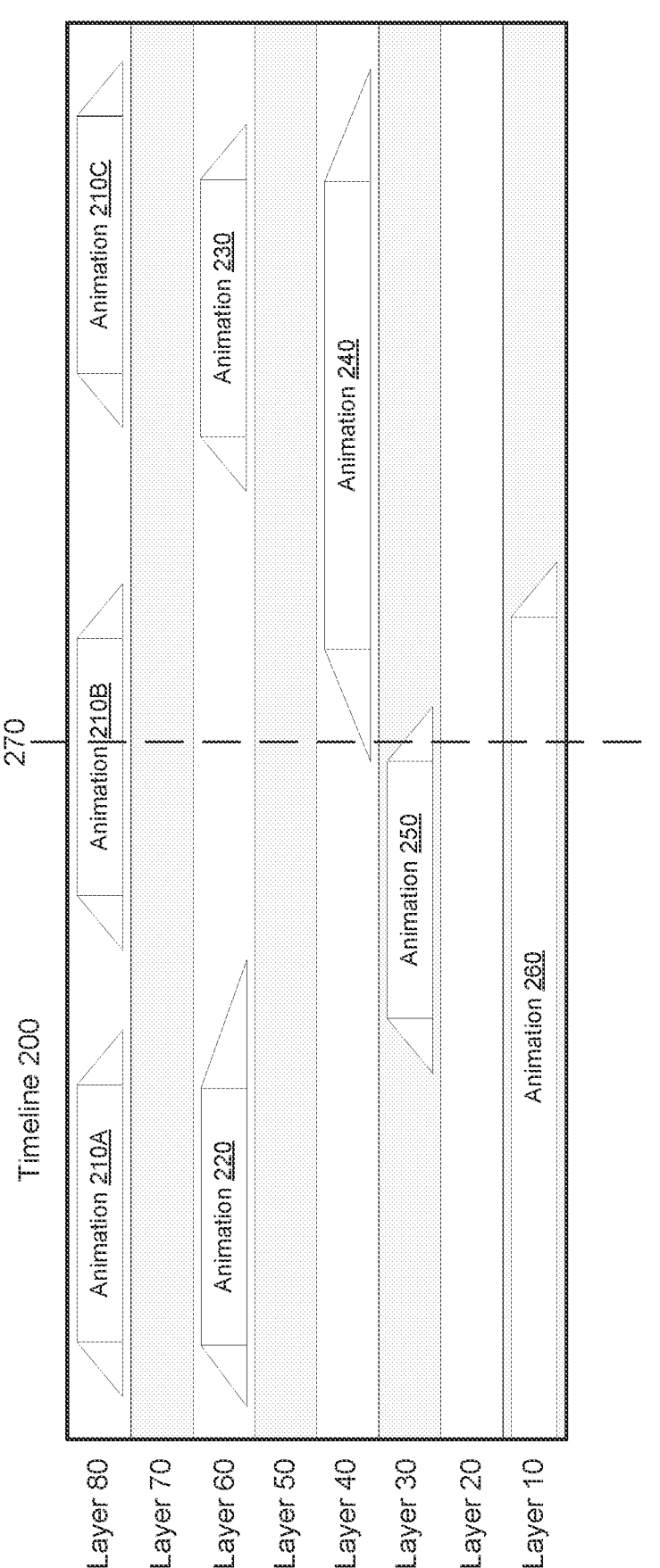
FIG. 2 illustrates an example representation of an animation timeline of an animation compositor, according to at least one embodiment.

FIG. 2 illustrates an example representation of an animation timeline 200 of an animation compositor, according to at least one embodiment. For example, animation timeline 200 may be created by animation compositor 112 in response to receiving events from animation event publisher 136. In some embodiments, animation timeline 200 may not be visible to an end user and is only used internally by an animation compositor and/or animation controller to control animations of the digital avatar. Animation timeline 200 may include one or more animations (e.g., animations 210A-C, animations 220-260, etc.). Line 270 may represent the current position of the timeline, with animations to the left of line 270 already having been rendered and reproduced and animations to the right of line 270 being scheduled to be rendered in the future.

After an event is received, the animation compositor (e.g., animation compositor 112) may add the animation(s) from the event to animation timeline 200 based on the properties of the animation. For example, if the animation has a start delay property, the animation (e.g., animation 230) may be added to the timeline at a point in the future (e.g., to the right of line 270) based on the value of the start delay property. In some embodiments, animations in animation timeline 200 have different durations (e.g., animation 240 is longer than animation 230).

In some embodiments, animations may have a blend-in duration (e.g., represented by triangles on the left side of the animations) and/or a blend-out duration (e.g., represented by triangles on the right side of the animations). In some embodiments, a blend-out duration may be longer than a blend-in duration for an animation (e.g., animation 220) or vice versa. In some embodiments, different animations have different blend-in/out durations (e.g., animation 230 vs. animation 240). During the blend-in/out portion of an animation, the opacity of the animation may be less than 100%. For example, at the start of the blend-in portion of an animation (or at the end of the blend-out portion), the opacity of the animation in the rendering may be 0% and at the end of the blend-in portion (or at the beginning of the blend-out portion), the opacity of the animation in the rendering may be 100%. There may be a linear progression from 0% to 100% (or from 100% to 0%) based on the duration of the blend-in (blend-out) portion. In some embodiments, an animation may have a maximum opacity less than 100%. For example, an animation may have a maximum opacity of 50% and the blend-in (blend-out) portion may go linearly from 0% to 50% (50% to 0%)

instead of 0% to 100% (100% to 0%). In some embodiments, the blend curve may be non-linear or may be generated adaptively (e.g., physics based) based on the current animation context.

An animation may be assigned to a particular layer (e.g., layers 10-80) based on a property of the animation (e.g., priority). Animations on a higher layer (e.g., animations 210A-C) may take precedence over animations on a lower layer (e.g., animations 220, 230, and 250). For example, if animation 210A and animation 220 both include an animation for eye movements of the digital avatar, the eye movement animation from animation 210A may be applied to the digital avatar because animation 210A is in a higher layer than animation 220.

In some embodiments, an animation may be scheduled to repeat periodically (e.g., animations 210A-C). In some embodiments, unrelated animations (e.g., animation 220 and animation 230) may be assigned to the same layer (e.g., layer 60). In some embodiments, the duration of a first animation (e.g., animation 260, animation 240) may span one or more other animations (e.g., animation 220, animation 210B, animation 250, animation 230, etc.).

Based on animation timeline 200, an animation compositor may create a blend tree based on the animations (and their corresponding properties) that overlap at a given time. The animation compositor may, for each frame of animation timeline 200 (e.g., 60 frames per second), generate rendering data containing shape transformations based on the animations that overlap at that point of animation timeline 200. The rendering data may include a temporal sequence of video frames and/or audio frames to be presented to a user. For example, at the time represented by line 270, the following animations may be blended in real-time or near real-time: animation 210B at 100% opacity, animation 240 at 10% opacity, animation 250 at 50% opacity, and animation 260 at 100% opacity. The rendering data may be provided to a renderer (e.g., avatar renderer 124 of FIG. 1) that applies the skeleton transformations, blendshapes, and/or other animation techniques to a rendered digital avatar.

In some embodiments, the animation compositor may blend graphical elements instead of (or in addition to) skeleton transformations and/or blendshapes. For example, animation 260 may include one or more graphical elements that are visible during multiple animations. A graphical user interface (GUI) may include multiple layers of elements. Some layers may only appear for a few frames, while others are present for many frames. Graphical elements of a higher layer (e.g., layer 60, layer 70, layer 80) may cover graphical elements contained within a lower layer (e.g., layer 10, layer 20, layer 30). Each layer of the GUI may correspond to an animation priority. In some embodiments, an event sent by an animation controller to an animation compositor may include both skeleton transformations and/or blendshapes and graphical elements. A graphical element may include text, an image, one or more shapes, and/or the like, and the graphical element may include one or more properties (e.g., a duration, an opacity, a priority/layer, and the like). In some embodiments, an animation may include a corresponding audio to be played while the animation is shown. The corresponding audio may include one or more associated properties (e.g., volume, start delay, sound channel, etc.).

FIGS. 3-4 are flow diagrams of example methods 300 and 400 of controlling animations of a digital avatar in real-time or near real-time, according to at least one embodiment. Methods 300 and 400 may be performed using one or more processing units (e.g., CPUs, GPUs, accelerators, physic processing units (PPUs), data processing units (DPUs), etc.), which may include (or communicate with) one or more memory devices. In at least one embodiment, methods 300 and 400 may be performed by digital avatar host 110 and/or animation controller 130. In at least one embodiment, processing units performing any of methods 300 and 400 may be executing instructions stored on a non-transitory computer-readable storage media. In at least one embodiment, any of methods 300 and 400 may be performed using multiple processor threads (e.g., CPU threads and/or GPU threads), individual threads executing one or more individual functions, routines, subroutines, or operations of the method. In at least one embodiment, processing threads implementing any of methods 300 and 400 may be synchronized (e.g., using semaphores, critical sections, and/or other thread synchronization mechanisms). Alternatively, processing threads implementing any of methods 300 and 400 may be executed asynchronously with respect to each other. Various operations of methods 300 and 400 may be performed in a different order compared with the order shown in FIGS. 3-4. Some operations of methods 300 and 400 may be performed concurrently with other operations. In at least one embodiment, one or more operations shown in FIGS. 3-4 may not always be performed.

FIG. 3 is a flow diagram of an example method 300 of controlling animations of a digital avatar in real-time or near real-time, according to at least one embodiment. At block 310, one or more processing devices performing method 300 may receive a user input associated with an interaction of a user with a digital avatar. The user input may include, without limitation, a spoken utterance, a facial expression, a body motion, and/or a tactile input. At block 320, the one or more processing devices may identify, based at least on the user input, a state of the interaction.

At block 330, the one or more processing devices may obtain, based at least on the state, one or more animations and one or more configuration settings corresponding to the one or more animations. In some embodiments, the configuration settings for the one or more animations includes at least one of a start time for a first animation of the one or more animations, a duration of the first animation, a duration of a blend-in period (e.g., blend-in portion) for the first animation, a duration of a blend-out period (e.g., blend-out portion) for the first animation, an opacity of a displayed representation of the first animation, or a priority of the first animation relative to at least a second animation of the one or more animations. In some embodiments, obtaining the one or more animations includes loading at least one stored animation from an animation data repository (e.g., repository 140 of FIG. 1). In some embodiments, obtaining the one or more animations includes generating, based at least on the configuration settings for the one or more animations, a procedural animation. For example, the procedural animation may be generated by procedural animation generator 134 of animation controller 130.

At block 340, the one or more processing devices may generate a blended animation based at least on the one or more animations and the one or more configuration settings for the one or more animations. In some embodiments, a first animation of the one or more animations includes a first set of shape transformations and a second animation of the one or more animations includes a second set of shape transformations. To generate the blended animation, the one or more processing devices may blend the first set of shape transformations with the second set of shape transformations. The first set of shape transformations may include at least one of a skeleton transformation, a blendshape, or a custom deformer.

At block 350, the one or more processing devices may render a temporal sequence of frames based at least on the blended animation. At block 360, the one or more processing devices may cause a presentation of the temporal sequence of frames. For example, the temporal sequence of frames may be presented via a digital display or one or more speakers of a digital avatar system. In some embodiments, a touch-screen interface is used for outputting the temporal sequence of frames.

FIG. 4 is a flow diagram of an example method 400 of controlling animations of a digital avatar in real-time or near real-time, according to at least one embodiment. At block 410, one or more processing devices performing method 400 may receive a second user input associated with the interaction of the user and the digital avatar. At block 420, the one or more processing devices may identify, based on the second user input, a second state of the interaction. At block 430, the one or more processing devices may obtain, based on the second state, one or more additional animations and configuration settings for the one or more additional animations. At block 440, the one or more processing devices may generate an additional blended animation based at least on the one or more additional animations and the configuration settings for the one or more additional animations. At block 450, the one or more processing devices may cause an interruption of the presentation of the temporal sequence of frames. At block 460, the one or more processing devices may render an additional temporal sequence of frames based on the additional blended animation. At block 470, the one or more processing devices may cause an additional presentation of the additional temporal sequence of frames.

Figure 5:
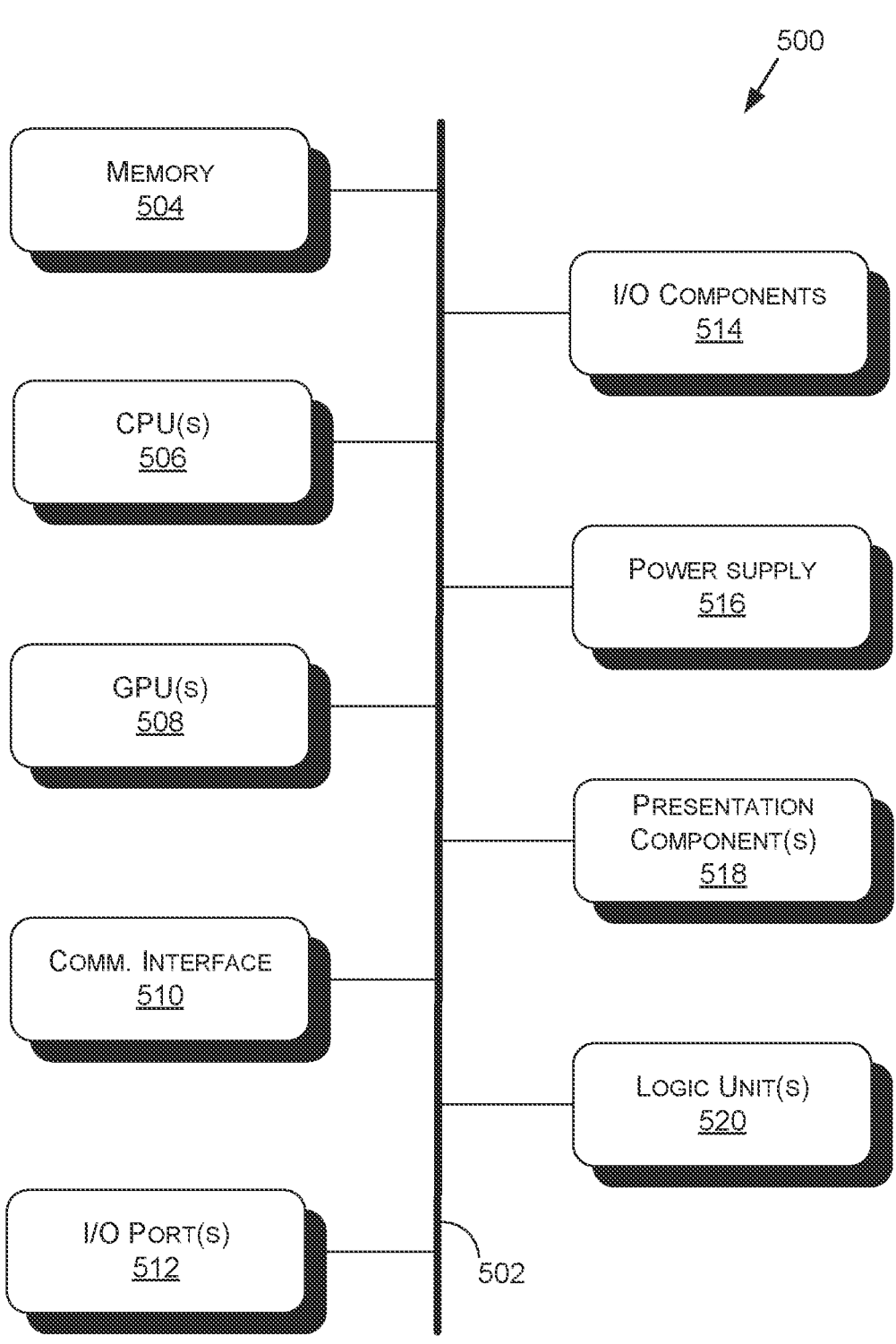
FIG. 5 is a block diagram of an example computing device suitable for controlling animations of a digital avatar in real-time or near real-time, in accordance with at least some embodiments.

FIG. 5 is a block diagram of an example computing device(s) 500 suitable for controlling animations of a digital avatar in real-time or near real-time, in accordance with at least some embodiments. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s)), such as an operating system. In accordance with one or more aspects of the present disclosure, the computer-readable instructions can comprise executable instructions for executing method 300 and/or method 400 of controlling animations of a digital avatar in real-time or near real-time. Computer-storage media may include, but is not limited to, random-access memory (RAM), read-only memory (ROM), electronically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, radio frequency (RF), infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. For example, in accordance with one or more aspects of the present disclosure, the CPU(s) 506 may be configured to execute instructions executing methods 300-400 of controlling animations of a digital avatar in real-time or near real-time. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof.

The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Figure 6:
FIG. 6 is a block diagram of an example content streaming system suitable for use in implementing some embodiments of the present disclosure.

Now referring to FIG. 6, FIG. 6 is an example system diagram for a content streaming system 600, in accordance with some embodiments of the present disclosure. FIG. 6 includes application server(s) 602 (which may include similar components, features, and/or functionality to the example computing device 500 of FIG. 5), client device(s) 604 (which may include similar components, features, and/or functionality to the example computing device 500 of FIG. 5), and network(s) 606 (which may be similar to the network(s) described herein). In some embodiments of the present disclosure, the system 600 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, digital avatar applications, and/or other application types. In some embodiments, application server(s) 602 may include digital avatar host 110 of FIG. 1, animation controller 130 of FIG. 1, and/or any combination thereof. In some embodiments, client devices(s) 604 may include digital avatar host 110 of FIG. 1 and/or a client device that interacts with digital avatar host 110.

In the system 600, for an application session, the client device(s) 604 may only receive input data in response to inputs to the input device(s), transmit the input data to the application server(s) 602, receive encoded display data from the application server(s) 602, and display the display data on the display 624. As such, the more computationally intense computing and processing is offloaded to the application server(s) 602 (e.g., rendering—in particular ray or path tracing—for graphical output of the application session is executed by the GPU(s) of the game server(s) 602). In other words, the application session is streamed to the client device(s) 604 from the application server(s) 602, thereby reducing the requirements of the client device(s) 604 for graphics processing and rendering.

For example, with respect to an instantiation of an application session, a client device 604 may be displaying a frame of the application session on the display 624 based on receiving the display data from the application server(s) 602. The client device 604 may receive an input to one of the input device(s) and generate input data in response. The client device 604 may transmit the input data to the application server(s) 602 via the communication interface 620 and over the network(s) 606 (e.g., the Internet), and the application server(s) 602 may receive the input data via the communication interface 618. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 612 may render the application session (e.g., representative of the result of the input data) and the render capture component 614 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 602. In some embodiments, one or more virtual machines (VMs)—e.g., including one or more virtual components, such as vGPUs, vCPUs, etc.—may be used by the application server(s) 602 to support the application sessions. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A. C}, {B. C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving a user input associated with an interaction of a user with a digital avatar;
   identifying, based at least on the user input, a state of the interaction;
   obtaining, based at least on the state, a plurality of animations and one or more configuration settings corresponding to the plurality of animations, wherein the configuration settings associate an individual animation of the plurality of animations with a priority level of a plurality of priority levels;
   generating a blended animation based at least on:
      a first animation of the plurality of animations, the first animation associated with a first priority level of the plurality of priority levels, and
      a second animation of the plurality of animations, the second animation associated with a second priority level of the plurality of priority levels, wherein the second priority level is lower than the first priority level, and
   wherein the blended animation comprises at least:
      a first period, within which the first animation obscures the second animation, and
      one or more second periods, within which visibility of the second animation is progressively altered, the one or more second periods comprising at least one of a blend-in period or a blend-out period of the second animation;
   rendering a temporal sequence of frames based at least on the blended animation; and
   causing a presentation of the temporal sequence of frames.

2. The method of claim 1, wherein the obtaining the plurality of animations comprises loading at least one stored animation from an animation data repository.

3. The method of claim 1, wherein the obtaining the plurality of animations comprises generating, based at least on the configuration settings for the plurality of animations, a procedural animation.

4. The method of claim 1, wherein the visibility of the second animation is modified non-linearly during at least one of the blend-in period or the blend-out period of the second animation.

5. The method of claim 1, wherein:

the first animation comprises a first set of shape transformations;

the second animation comprises a second set of shape transformations; and wherein generating the blended animation comprises blending the first set of shape transformations with the second set of shape transformations.

6. The method of claim 5, wherein the first set of shape transformations comprises at least one of:

a skeleton transformation;

a blendshape; or a custom deformer.

7. The method of claim 1, further comprising:

receiving a second user input associated with the interaction of the user with the digital avatar;

identifying, based on the second user input, a second state of the interaction;

obtaining, based on the second state, one or more additional animations and configuration settings for the one or more additional animations;

generating an additional blended animation based at least on the one or more additional animations and the configuration settings for the one or more additional animations;

causing an interruption of the presentation of the temporal sequence of frames;

rendering an additional temporal sequence of frames based on the additional blended animation; and causing an additional presentation of the additional temporal sequence of frames.

8. The method of claim 1, wherein the temporal sequence of frames comprises at least one of a sequence of video frames or a sequence of audio frames, and wherein the causing the presentation of the temporal sequence of frames comprises at least one of:

causing the sequence of video frames to be displayed by a graphical user interface (GUI); or causing the sequence of audio frames to be played using one or more speakers.

9. The method of claim 1, wherein the user input comprises at least one of a spoken utterance, a facial expression, a body motion, or a tactile input.

10. A method comprising:

receiving, via one or more input devices, a user input associated with an interaction of a user with a digital avatar;

identifying, based at least on the user input and using an animation controller, a state of the interaction of the user with the digital avatar;

obtaining, based at least on the state of the interaction, a plurality of animations and configuration settings for the plurality of animations, wherein the configuration settings associate an individual animation of the plurality of animations with a priority level of a plurality of priority levels;

providing, using the animation controller, the plurality of animations and configuration settings for the plurality of animations to an animation compositor;

generating, using the animation compositor, a blended animation based at least on:

a first animation of the plurality of animations, the first animation associated with a first priority level of the plurality of priority levels, and a second animation of the plurality of animations, the second animation associated with a second priority level of the plurality of priority levels, wherein the second priority level is lower than the first priority level, and wherein the blended animation comprises at least:

a first period, within which the first animation obscures the second animation, and one or more second periods, within which visibility of the second animation is progressively altered, the one or more second periods comprising at least one of a blend-in period or a blend-out period of the second animation;

rendering a first temporal sequence of frames based on the blended animation; and outputting, using one or more output devices, the first temporal sequence of frames.

11. The method of claim 10, wherein the obtaining the plurality of animations comprises loading at least one stored animation from an animation data repository.

12. The method of claim 10, wherein the obtaining the plurality of animations comprises generating, based on the configuration settings for the plurality of animations, a procedural animation.

13. The method of claim 10, wherein the visibility of the second animation is modified non-linearly during at least one of the blend-in period or the blend-out period of the second animation.

14. The method of claim 10, wherein:

the first animation comprises a first set of shape transformations;

the second animation comprises a second set of shape transformations; and wherein generating the blended animation comprises blending the first set of shape transformations with the second set of shape transformations.

15. The method of claim 14, wherein the first set of shape transformations comprises at least one of:

a skeleton transformation;

a blendshape; or a custom deformer.

16. The method of claim 10, further comprising:

receiving a second user input associated with the interaction of the user with the digital avatar;

identifying, based on the second user input, a second state of the interaction of the user with the digital avatar;

obtaining, based on the second state of the interaction, one or more additional animations and configuration settings for the one or more additional animations;

generating an additional blended animation based at least on the one or more additional animations and the configuration settings for the one or more additional animations;

interrupting the outputting of the first temporal sequence of frames;

rendering a second temporal sequence of frames based on the additional blended animation; and outputting the second temporal sequence of frames.

17. The method of claim 10, wherein the first temporal sequence of frames comprises at least one of a sequence of video frames or a sequence of audio frames, and wherein outputting the first temporal sequence of frames comprises at least one of:

displaying, using a graphical user interface (GUI), the sequence of video frames; or playing, using one or more speakers, the sequence of audio frames.

18. A system comprising:

one or more processing units to:

receive a user input associated with an interaction of a user with a digital avatar;

identify, based at least on the user input, a state of the interaction;

obtain, based at least on the state, a plurality of animations and one or more configuration settings corresponding to the one or more plurality of animations, wherein the configuration settings associate an individual animation of the plurality of animations with a priority level of a plurality of priority levels;

generate a blended animation based at least on;

a first animation of the plurality of animations, the first animation associated with a first priority level of the plurality of priority levels, and a second animation of the plurality of animations, the second animation associated with a second priority level of the plurality of priority levels, wherein the second priority level is lower than the first priority level, and wherein the blended animation comprises at least:

a first period, within which the first animation obscures the second animation, and one or more second periods, within which visibility of the second animation is progressively altered, the one or more second periods comprising at least one of a blend-in period or a blend-out period of the second animation;

render a temporal sequence of frames based at least on the blended animation; and cause a presentation of the temporal sequence of frames.

19. The system of claim 18, wherein the one or more processing units are further to:

receive a second user input associated with the interaction of the user with the digital avatar;

identify, based on the second user input, a second state of the interaction;

obtain, based on the second state, one or more additional animations and configuration settings for the one or more additional animations;

generate an additional blended animation based at least on the one or more additional animations and the configuration settings for the one or more additional animations;

cause an interruption of the presentation of the temporal sequence of frames;

render an additional temporal sequence of frames based on the additional blended animation; and cause an additional presentation of the additional temporal sequence of frames.

20. The system of claim 18, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

* * * * *